US006215081B1

(12) United States Patent
Jensen et al.

(10) Patent No.: US 6,215,081 B1
(45) Date of Patent: Apr. 10, 2001

(54) BISTABLE COMPLIANT MECHANISM

(75) Inventors: Brian D. Jensen, Albuquerque, NM (US); Larry L. Howell, Orem; Gregory M. Roach, Springville, both of UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 09/280,916

(22) Filed: Mar. 29, 1999

Related U.S. Application Data

(60) Provisional application No. 60/098,633, filed on Aug. 31, 1998.

(51) Int. Cl.[7] .............................. H01H 3/00; F16F 1/00

(52) U.S. Cl. .............................. 200/341; 267/158; 267/182

(58) Field of Search .............................. 200/329, 341, 200/343, 339, 600, 181; 267/157–182

(56) References Cited

U.S. PATENT DOCUMENTS

| | | | | |
|---|---|---|---|---|
| 3,264,884 | | 8/1966 | Brooker | 200/329 X |
| 3,289,877 | | 12/1966 | Wolf | 16/225 X |
| 3,403,237 | | 9/1968 | Wysong | 200/339 X |
| 3,512,227 | | 5/1970 | Krawagna | 248/113 |
| 3,582,584 | | 6/1971 | Best | 200/556 |
| 3,582,594 | * | 6/1971 | Twyford | 200/341 |
| 3,594,852 | | 7/1971 | Krawagna | 16/150 |
| 3,668,356 | * | 6/1972 | Kekas | 200/341 |
| 3,720,979 | | 3/1973 | Krawagna | 16/150 |
| 3,742,171 | | 6/1973 | Howe | 200/302.3 |
| 4,054,766 | | 10/1977 | Kramer | 200/343 X |
| 4,332,991 | | 6/1982 | Nordstrom | 200/339 X |
| 5,006,681 | | 4/1991 | Postmus et al. | 200/409 |
| 5,285,039 | | 2/1994 | Satoh | 200/563 |
| 5,495,080 | | 2/1996 | Periou et al. | 200/283 |
| 6,046,659 | * | 4/2000 | Loo et al. | 200/181 |

* cited by examiner

*Primary Examiner*—J. R. Scott
(74) *Attorney, Agent, or Firm*—Thorpe, North & Western, LLP

(57) ABSTRACT

A compliant, bistable mechanism has a plurality of segments coupled end-to-end in a series to form a continuous chain of segments. The plurality of segments includes at least two rigid segments and at least one relatively flexible and resilient segment. Adjacent rigid segments are coupled by flexible joints or pin joints. The flexible and resilient segment is coupled to adjacent segments either fixedly or by pin joints. There are at least four pin joints, flexible joints, and/or flexible and resilient segments. The joints allow relative movement of the segments while the flexible and resilient segment resists movement and biases the segments. The segments move between first and second stable equilibrium positions. The segments have a pseudo-rigid-body model resembling a four-bar linkage. The segments and flexible joints may be integrally formed. First and second electrical contacts may be coupled to the segments to form an electrical connection as the segments move to one of the positions.

104 Claims, 6 Drawing Sheets

BISTABLE COMPLIANT MECHANISM

This application claims the benefit of U.S. Provisional Application No. 60/098,633, filed Aug. 31, 1998.

BACKGROUND OF THE INVENTION

1. Field of the Invention

The present invention relates to a mechanism which is compliant and stable in two positions, and which is particularly well suited for use with electrical switches. More particularly, the present invention relates to a mechanism having a plurality of segments coupled end-to-end in series with at least two rigid segments and at least one flexible and resilient segment.

2. Prior Art

Switches are used to activate or adjust an electrical or mechanical system. A toggle switch is one that permits adjustment only to a certain limited number of settings; a bistable switch is further limited in that only two settings are available. As such, bistable switches are very useful for electric circuits, in which it is desirable to open a circuit to cut off the power to an electric device, thereby turning it off. Bistable switches are similarly useful in mechanical systems where the switch is to maintain the system in one of two states.

Many different bistable toggle switches have been invented. The majority are either of the push-button type, such as jumper switches for fuse boxes, the rotary type, as found in many appliances such as stoves and ovens, or the rocker type, which are most commonly mounted on walls to control household electric devices. Both types of switches are in wide use in electrical applications. Switches include some surface or member situated for the transmission of external forces into the switch. In the case of an ordinary household light switch, for example, this can take the form of a post designed to be pushed up or down by a hand or finger. Additionally, mechanical joints such as hinges often require a bistable rocking, rotating, or translating action; this can be accomplished by a bistable switch mechanism. Although the switches are typically inexpensive and small in size, the large number of these switches in common use provides the incentive for reduction of the costs involved in manufacturing them.

Many switches function using some type of linkage to transform the input force to the desired output motion. A linkage is a mechanical system made up of four or more members, or links, which are connected to each other by means of joints that allow the links to pivot or slide with respect to each other. Traditionally, the links were rigid and the joints between them utilized pinned joints, sockets, or mechanical sliders to effect the relative motion. The length of the links and the nature of the joints could be adjusted to obtain the desired output motion in one link from a given input motion or force on another link.

Such a linkage system can be made bistable by the insertion of a device that exerts a linear or torsional force on a sliding or pivoting joint, respectively. These devices are often simple springs; the stable linkage positions are those in which the spring deflection is at a relative minimum. Therefore, the stable points for the linkage system are those in which motion of the linkage in either direction will increase the total potential energy stored in the mechanisms.

There are many disadvantages associated with traditional mechanical linkage systems. One disadvantage with traditional mechanisms is that the links must be separately made and assembled with the joints; as a result, the cost of manufacturing linkages on a large scale is considerable. In addition, there are the usual difficulties associated with surfaces that slide against each other. These difficulties include wear, friction losses, and the need for lubrication.

Therefore, it would be advantageous to develop a bistable mechanism capable of movement between two stable positions. It would also be advantageous to develop such a bistable mechanism capable of simple and inexpensive manufacture. It would also be advantageous to develop such a bistable mechanism with a reduced number of parts. It would also be advantageous to develop such a bistable mechanism with few or no wear surfaces. It would also be advantageous to develop such a bistable mechanism capable of use with electrical switches.

OBJECTS AND SUMMARY OF THE INVENTION

It is an object of the present invention to provide a bistable mechanism.

It is another object of the present invention to provide a bistable mechanism movable between two stable positions.

It is a further object of the present invention to provide a bistable mechanism with few parts.

It is a further object of the present invention to provide a bistable mechanism with few wear surfaces.

It is a further object of the present invention to provide a bistable mechanism for use with electrical switches.

These and other objects and advantages of the present invention are realized in a compliant, bistable mechanism having a plurality of segments coupled end-to-end in series to form a continuous chain of segments. The plurality of segments includes at least two relatively rigid segments, and at least one relatively flexible and resilient segment.

Adjacent rigid segments are coupled by either flexible joints or pin joints. The relatively flexible and resilient segment is coupled to adjacent segments either fixedly or by pin joints. The sum of the pin joints, the flexible joints and/or the relatively flexible and resilient segments is at least four.

The relatively flexible and resilient segment operates to resist relative movement of the segments, but allows the segments to be selectively moved. The plurality of segments are biased by the at least one relatively flexible and resilient segment. The plurality of segments are cooperatively movable relative to one another between (i) a first, stable, static, equilibrium position, and (ii) a second, stable, static, equilibrium position.

In accordance with one aspect of the present invention, the first position is a low-energy position in which the at least one relatively flexible and resilient member is substantially undeflected, and stores substantially no energy, or low energy relative to surrounding positions. The second position is a force loaded position in which the at least one relatively flexible and resilient segment is deflected, and stores energy such that the mechanism exerts a force in the second position. Alternatively, the at least one relatively flexible and resilient segment may be deflected in one or both of the first and second positions. In addition, both first and second positions may be low-energy positions in which the relatively flexible and resilient segment is undeflected.

In accordance with another aspect of the present invention, the at least two relatively rigid segments are coupled by, and formed integrally with, a substantially flexible joint. In addition, all of the plurality of segments may be integrally formed from a single piece of material.

The single piece of material has cross sectional dimensions of (i) relatively wide portions, (ii) relatively thin portions, and (iii) at least one portion with an intermediate width. The relatively rigid segments are formed of the relatively wide portions, and thus are generally rigid. The substantially flexible segments are formed of the relatively thin portions, and thus are generally compliant. The relatively flexible and resilient segment is formed of the portion of intermediate width, and thus is both flexible and resilient.

In accordance with the preferred embodiment of the present invention, the plurality of segments includes four relatively rigid segments coupled end-to-end in series by three substantially flexible joints, or pivot joints, and one relatively flexible and resilient segment. The relatively flexible and resilient segment is fixedly coupled to adjacent rigid segments.

In accordance with the preferred embodiment of the present invention, two electrical contacts are coupled to the plurality of segments including first and second electrical contacts. The first electrical contact is movable with one of the segments between (i) a first location, and (ii) a second location. In the first location, the first electrical contact contacts the second electrical contact, and defines an on position. In the second location, the first electrical contact is in a non-contacting relationship with the second electrical contact, and defines an off position.

In accordance with one aspect of the present invention, the plurality of segments has a pseudo-rigid-body model resembling a four-bar linkage. In addition, the mechanism may be a Young mechanism, a Grashof mechanism, or a non-Grashof mechanism. In addition, the mechanism may be a MEMS (micro-electo-mechanical system), and each segment has a length less than 500 microns. In addition, each segment may have a thickness less than 3 microns.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
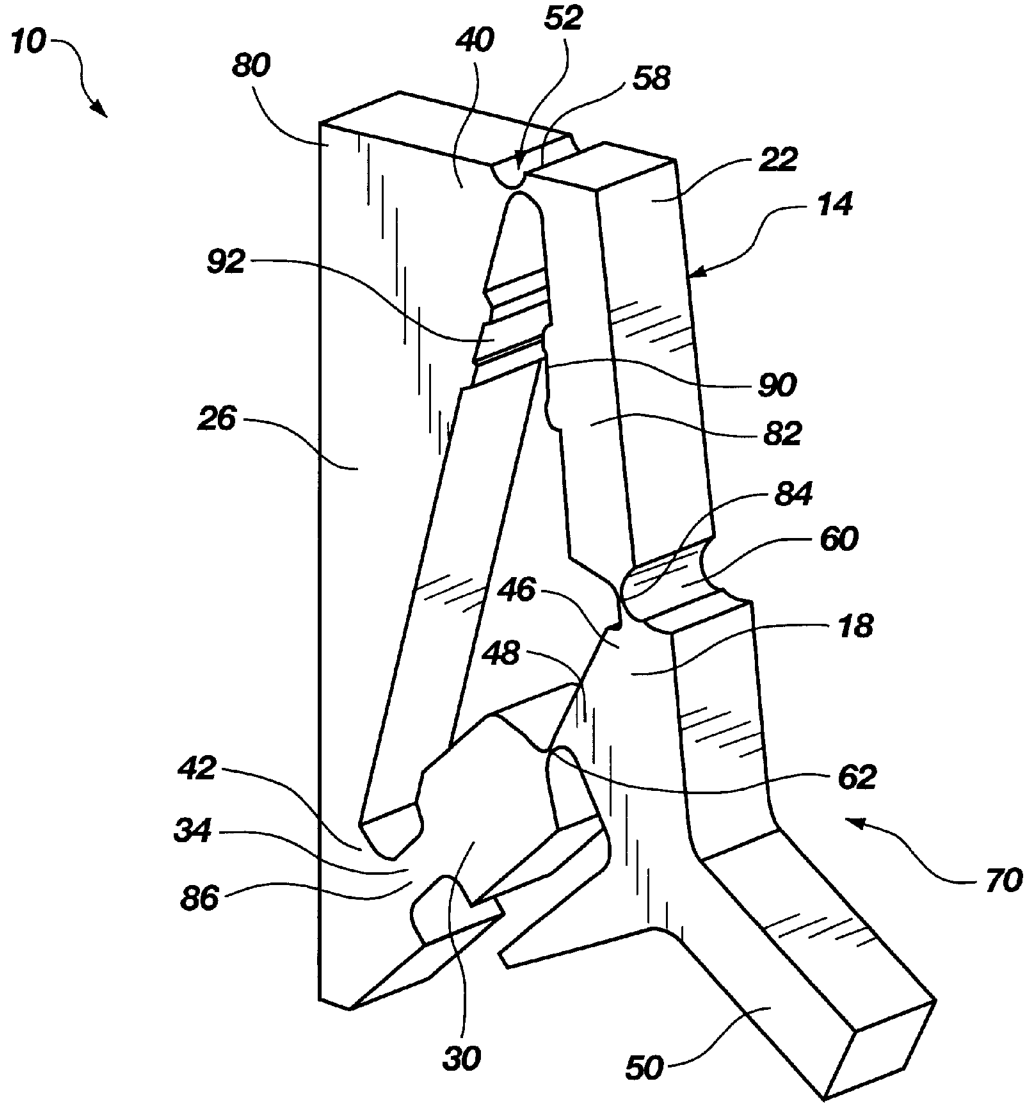
FIG. 1 is a perspective view of a preferred embodiment of a bistable switch mechanism of the present invention.

As illustrated in FIG. 1, a bistable switch mechanism, indicated generally at 10, in accordance with a preferred embodiment of the present invention is shown. The switch mechanism 10 has a plurality of segments, indicated generally at 14, coupled end-to-end in series to form a continuous chain of segments.

Several terms are used to describe and characterize mechanisms and their components, which are defined as follows. Rigid-body mechanisms are constructed of rigid links joined with kinematic pairs, such as pin joints and sliders. These components are easily identified and characterized. Since compliant mechanisms gain at least some of their motion from the deflection of flexible members, components such as links and joints are not as easily distinguished. Identification of such components is necessary to allow the accurate communication of design and analysis information.

A "link" is defined as the continuum connecting the mating surfaces of one or more kinematic pairs. Revolute (pin or turning) joints and prismatic (sliding) joints are examples of kinematic pairs. Links can be identified by disassembling the mechanism at the joints and counting the resulting links.

A mechanism with no traditional joints has zero links. Such mechanisms are termed "fully compliant" mechanisms, since all of their motion is obtained from the deflection of compliant members. Compliant mechanisms that contain one or more traditional kinematic pairs along with compliant members are called "partially compliant" mechanisms.

For a rigid link, the distances between joints are fixed, and the shape of the link is kinematically unimportant regardless of the applied forces. The motion of a compliant link, however, is dependent on link geometry and the location and magnitude of applied forces. Because of this difference, a compliant link is described by its structural type and its functional type.

The structural type is determined when no external forces are applied and is similar to the identification of rigid links. A rigid link that has two pin joints is termed a "binary link." A rigid link with three or four pin joints is a "ternary" or a "quaternary link," respectively. A compliant link with two pin joints has the same structure as a binary link, and is called a "structurally binary link," and so on for the other types of links.

A link's functional type takes into account the structural type and the number of pseudo joints. Pseudo joints occur where a load is applied to a compliant segment. If a force is applied on a compliant link somewhere other than at the joints, its behavior may change dramatically. A structurally binary link with force or moment loads only at the joints is termed "functionally binary." A compliant link with three pin joints is "structurally ternary," and if loads are only applied at the joints, it is also "functionally ternary." The same applies for quaternary links. If a link has two pin joint connections and also has a force on a compliant segment, it is "structurally binary" and "functionally ternary" due to the added pseudo joint caused by the force.

While the definition of a link used above is consistent with that for rigid-body kinematics, it is not very descriptive of a compliant link. The application of a force or moment to a compliant link affects the deformation of the link, and therefore, its contribution to the mechanism's motion. Link characteristics that influence its deformation include cross-sectional properties, material properties, and magnitude and placement of applied loads and displacements. Thus, a compliant link is further characterized into "segments."

A link may be composed of one or more "segments." The distinction between segments is a matter of judgement, and may depend on the structure, function, or loading of the mechanism. Discontinuities in material or geometric properties often represent the end points of segments. Since the distance between the end points of a rigid segment remains constant, it is considered a single segment, regardless of its size or shape.

The characteristics of individual segments and links may also be described. A segment may be either rigid or compliant. This is referred to as a segment's "kind." A compliant segment may be further classified by its category of either simple or compound. A simple segment is one that is initially straight, has constant material properties, and a constant cross-section. All other segments are compound.

A link may be either rigid or compliant (its kind) and may consist of one or more segments. A rigid link needs no more characterization. A compliant link may be either simple or compound (its category). A simple compliant link consists of one simple compliant segment; all others are compound links. A compound link may be either homogeneous or nonhomogeneous. This is its "family." A homogeneous link is one that consists of all rigid segments or all compliant segments. Therefore, rigid links and simple compliant links are special cases of homogeneous links. Nonhomogeneous links contain both rigid and flexible segments.

Traditional mechanism analysis employs the assumption that the deflections of a mechanism's parts are negligible compared to the overall motion of the mechanism. If the parts are rigid, the mechanism motion is not a function of the shape of the links or the applied forces. This allows motion analysis (kinematics), and the analysis of motion and the forces that produce it (kinetics), to be analyzed independently, thus simplifying the analysis.

The minimum number of variables required to describe the configuration of a mechanism completely is called its "degrees of freedom." An unconstrained planar rigid link has three degrees of freedom because three displacement variables are required to describe its position and orientation. Therefore, the total possible degrees of freedom in a plane of n unconstrained links is 3n. By definition, a mechanism has one fixed link, which has zero degrees of freedom. The maximum possible degrees of freedom in a plane of an n-link mechanism is then 3(n−1).

When links are connected together with joints it is called a "kinematic chain." The chain is considered a mechanism if one of the links is considered to be the fixed link, which means that it is chosen as the reference link. The fixed link is usually the frame or base link connected to ground. The basic kinematic chain has the same relative motion between links, regardless of which link is fixed. A kinematic inversion is obtained when a different link is fixed. This does not change the relative motion between links, but can drastically change the absolute motion of the mechanism.

Grashof's law states that for at least one link of a four-bar mechanism to have full rotation, the following inequality must hold: $s+l \leqq p+q$ , where s is the length of the shortest link, 1 is the length of the longest link, and p and q are the lengths of the remaining links. The shortest link of a Grashofian mechanism is allowed full rotation relative to its adjacent links. Different types of mechanisms are based on which link is the shortest link. For example, if a side link is the shortest link in a Grashofian mechanism, then it is called a "crank rocker" mechanism; the shorter side link (the crank) is able to revolve, and the other side link (the rocker) rocks between two limit positions.

The plurality of segments 14 includes at least two relatively rigid segments and at least one relatively flexible and resilient segment. As shown, the switch mechanism 10 preferably has four rigid segments 18, 22, 26 and 30, and one relatively flexible and resilient segment 34. The segments 14 are coupled at coupling points.

In the preferred embodiment of the switch mechanism 10, the plurality of segments 14 includes a first relatively rigid base segment 26, a second relatively rigid coupling segment 18, and first and second arm segments 22 and 30. The base segment 26 may be fixed and has first and second ends 40 and 42. Similarly, the coupling segment 18 has first and second ends 46 and 48. The first arm segment 22 is coupled between the first ends 40 and 46 of the base segment 26 and the coupling segment 18. Similarly, the second arm segment 30 is coupled between the second ends 42 and 48 of the base segment 26 and the coupling segment 18.

An engagement member 50 may extend from the coupling segment 18 for a user to engage the mechanism 10. In the application of an electrical switch, many of the segments 14, such as the segments 22, 26 and 30, are disposed in a wall or panel behind a face plate (not shown) while the engagement member 50 protrudes from the face plate, as is common in typical household switches.

Figure 3A:
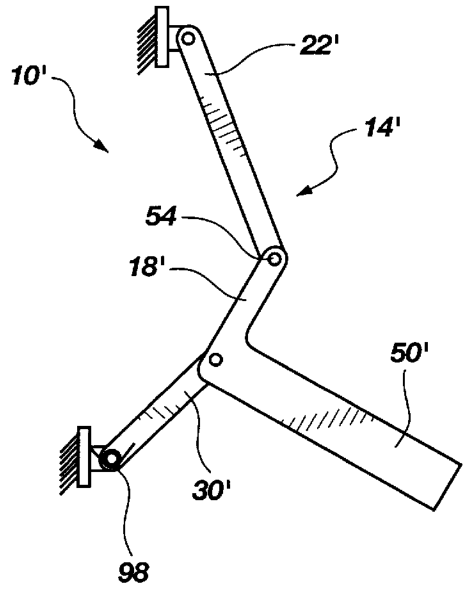
FIGS. 3*a* and 3*b* are schematic views of the preferred embodiment of the bistable switch mechanism of the present invention showing its corresponding pseudo-rigid-body model.

The rigid segments 18, 22, 26 and 30 are coupled to adjacent rigid segments by either flexible joints, indicated generally at 52, or pin joints 54 (FIG. 3*a*). The flexible joints 52 are substantially flexible and may be formed by a "living hinge". The pin joints 54 (FIG. 3*a*) are typical pin joints and are well known in the art.

Extremely short and thin small-length flexural pivots are often called "living hinges." The pseudo-rigid-body model, as discussed more fully below, of a pin joint at the center of the flexible segment is highly accurate for living hinges. In systems with both living hinges and other compliant segments, the rigidity of the living hinges is often so low, compared with the other flexible segments in a system, that their torsional springs are ignored. However, if a system contains only living hinges, then their rigidity should be considered in the analysis.

A pin joint allows rotation about one axis, but does not allow rotation in any other axis or translation in any direction. A door hinge is a common example of a pin joint. Small-length flexural pivots have behavior similar to pin joints, but they use the deflection of flexible members to obtain motion rather than pure rotation of parts about a pin. The "hinge" of a cover of a hardcover book is an example of a small-length flexural pivot. The rigidity of the flexible portion is much smaller than the more rigid part due to a change in both material and geometry.

There are many types of small-length flexural pivots, and a living hinge is a special case small-length flexural pivot. They are very small in length, offer little resistance to deflection, and approximate very closely the behavior of a pin joint. They offer so little resistance to bending, that they are often modeled with the pseudo-rigid-body model as a pin joint without a torsional spring.

Polypropylene is the most commonly used material for living hinges. Other materials may be used but will usually result in a shorter life. In some applications, life is not a major concern since the hinge may only be expected to flex once. For example, many containers are constructed of a single piece of material and then folded at living hinges to make the container. In such cases, the designer has many acceptable options in material and geometry choices. In most compliant mechanism designs, however, living hinges are expected to endure many cycles without failure. The discussion that follows assumes that a long life is required. The recommendations are summarized from the experience of several plastics suppliers and other sources. Living hinges made using these methods have been tested to undergo millions of cycles without failure.

Hinges may be made by injection molding, extrusion, hot-stamping, and blow molding. When injection molded, the molten plastic should be caused to flow perpendicular to the hinge. This causes a good fill and also helps align the material in a favorable direction. Extruded hinges will have a much shorter life because the material flow is parallel to the hinge axis.

The hinge should be flexed immediately after molding while the heat from the mold is still present. It should be flexed once slowly then rapidly several times. Flexing will stretch the hinge area considerably (a 0.010 in thickness may thin down to less than 0.005 in.). The elongation orients the material and dramatically increases the tensile strength. A thin, white line will appear on the hinge after flexing. This is normal and does not mean that the hinge has been weakened.

Some molding considerations are as follows: Cylinder temperature—450–550 degrees F.; injection speed—fast; mold temperatures—120 to 150 degrees F.; gate opening—if possible make up to 50% larger than for non-hinged parts. If using a single gate, locate it to ensure smooth flow to hinge area, make the flow perpendicular to the hinge axis, place the gate slightly to the rear of the center lines of the largest cavity, and center it if the flow to the hinge is greater than 8 in. For multiple gates: ensure that gates on the same side of the hinge are no farther apart than twice the distance from gate to hinge; if the flow on the opposite side of the hinge is greater than 8 in., the part should be gated in both sides; locate so a weld line does not form at the hinge. The hinge should be an insert machined from hardened steel to resist the stresses of the flowing resin.

In the preferred embodiment of the switch mechanism 10, the base segment 26 is coupled to the first arm segment 22 by a first flexible joint 58; the coupling segment 18 is coupled to the first arm segment by a second flexible joint 60; and the coupling segment 18 is coupled to the second arm segment 30 by a third flexible joint 62.

In the preferred embodiment of the switch mechanism 10, the plurality of segments 14 includes one relatively flexible and resilient segment 34. The relatively flexible and resilient segment 34 is compliant, or is able to bend or deflect.

The relatively flexible and resilient segment 34 is coupled to adjacent segments either fixedly, or by a pin joint 54 (FIG. 3*a*). In the preferred embodiment of the switch mechanism 10, the relatively flexible and resilient segment 34 is fixedly coupled to and between the base segment 26 and the second arm segment 30.

The sum of the pin joints 54 (FIG. 3*a*), the flexible joints 52, and the relatively flexible and resilient segments 34 is at least four. In the preferred embodiment of the switch mechanism 10, there are three flexible joints 58, 60 and 62, and one relatively flexible and resilient segment 34, which sum to four.

Figure 3B:
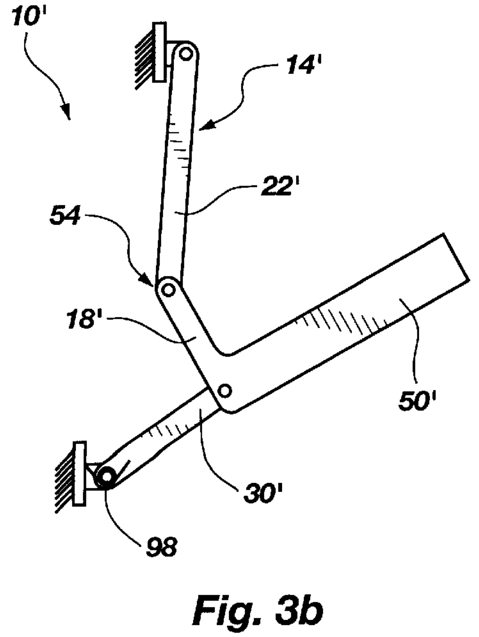

Referring to FIGS. 3*a* and 3*b*, a pseudo-rigid-body model, indicated generally at 10', of the mechanism is shown. The pseudo-rigid-body model 10' resembles, or corresponds to, a four-bar linkage.

The purpose of the pseudo-rigid-body model is to provide a simple method of analyzing systems that undergo large, nonlinear deflections. The pseudo-rigid-body model concept is used to model the deflection of flexible members using rigid-body components that have equivalent force-deflection characteristics. Rigid-link mechanism theory may then be used to analyze the compliant mechanism. In this way, the pseudo-rigid-body model is a bridge that connects rigid-body mechanism theory and compliant mechanism theory. The method is particularly useful in the design of compliant mechanisms. Different types of segments require different models.

For each flexible segment, a pseudo-rigid-body model predicts the deflection path and force-deflection relationships of a flexible segment. The motion is modeled by rigid links 14' attached at pin joints 54. Springs 98 are added to the model 10' to accurately predict the force-deflection relationships of the compliant segments 34 (FIG. 1). The key for each pseudo-rigid-body model is to decide where to place the pin joints and what value to assign the spring constants.

Figure 3C:
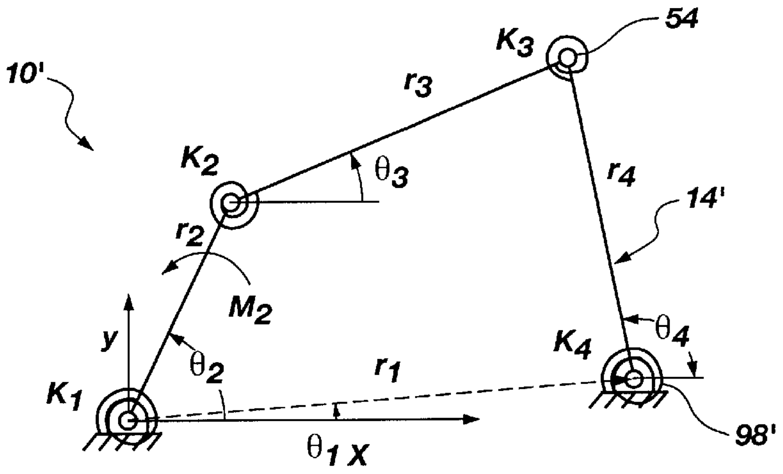
FIG. 3*c* is a pseudo-rigid-body model of a general four-link mechanism with torsional springs at each joint.

As indicated above, the pseudo-rigid-body model 10' resembles a four-bar mechanism. Referring to FIG. 3*c*, a moment acts on link two, the input link. A torsional spring 98' at each of the four pin joints 54 allows energy to be stored as the mechanism 10' moves. The torsional springs 98' represent the stiffness of a compliant segment (34 in FIG. 1), as specified in the pseudo-rigid-body model. The energy stored in each spring may be found from $$V_i=\tfrac{1}{2}K_i\psi_i^2 \quad (1)$$

where V is the potential energy, K is the torsional spring constant, and $\psi$ is the angular deflection of each torsional spring. For each spring 98' shown in FIG. 3*c*, $$\psi_1=\theta_2-\theta_{20}$$

$$\psi_2=(\theta_2-\theta_{20})-(\theta_3-\theta_{30})$$

$$\psi_3=(\theta_4-\theta_{40})-(\theta_3-\theta_{30})$$

$$\psi_4=\theta_4-\theta_{40} \quad (2)$$

where the "0" subscripts symbolizes the initial (undeflected) value of the angle. The total potential energy of the system may then be given as $$V=\tfrac{1}{2}(K_1\psi_1^2+K_2\psi_2^2+K_3\psi_3^2+K_4\psi_4^2) \quad (3)$$

The values of each $\psi$ may be found using kinematic analysis for all positions of the mechanism, allowing a graph of potential energy to be constructed. Any positions corresponding to local minima are stable positions; any local maxima represent unstable equilibrium positions.

The stability of the mechanism 10' can also be determined analytically. The principle of virtual work can be used to find the values of arbitrary moments or forces required to keep a mechanism in a particular position. For analyzing the bistable characteristics of the mechanism, however, only the value of $M_2$, as shown in FIG. 3*c*, is necessary. This moment represents the moment that must be applied to the input link to keep the mechanism in a given position. At the equilibrium positions, its value will be zero. The $M_2$ curve may be found by realizing that it is the first derivative of the energy curve with respect to the angle of the input link. This may be proved by considering the equation for work put into the system:

$$V = \int_{\theta_{20}}^{\theta_2} M_2 d\theta \tag{4}$$

by taking the derivative of this equation, it may be seen that $$\frac{dV}{d\theta_2} = M_2 \tag{5}$$

assuming that the moment at the initial position is zero. Therefore, $M_2$ is equal to the first derivative of the energy with respect to the angle of the input link. This means that $$M_2 = K_1\psi_1 + K_2\psi_2\frac{d\psi_2}{d\theta_2} + K_3\psi_3\frac{d\psi_3}{d\theta_2} + K_4\psi_4\frac{d\psi_4}{d\theta_2} \tag{6}$$

The derivatives in Equation (6) above may be evaluated using Equation (2) and the additional formulas $$\frac{d\theta_3}{d\theta_2} = h_{32} = \frac{r_2 \sin(\theta_4 - \theta_2)}{r_3 \sin(\theta_3 - \theta_4)} \tag{7}$$

and $$\frac{d\theta_4}{d\theta_2} = h_{42} = \frac{r_2 \sin(\theta_3 - \theta_2)}{r_4 \sin(\theta_4 - \theta_3)} \tag{8}$$

As mentioned previously, the value of $M_2$ will be zero at all equilibrium positions. The stability of the equilibrium position may be determined by considering the sign of the second derivative of the energy curve at that point. The second derivative is $$\frac{d^2V}{d\theta_2^2} = K_1 + K_2(1 - 2h_{32} + h_{32}^2 - \psi_2 h_{32}') + K_3[h_{42}^2 - 2h_{42}h_{32} + h_{32}^2 + \psi_3(h_{42}' - h_{32}')] + K_4(h_{42}^2 + \psi_4 h_{42}') \tag{9}$$

where $$h_{32}' = \frac{dh_{32}}{d\theta_2} = \frac{r_2}{r_3}\left[\frac{\cos(\theta_4 - \theta_2)}{\sin(\theta_3 - \theta_4)}(h_{42} - 1) - \frac{\sin(\theta_4 - \theta_2)\cos(\theta_3 - \theta_4)}{\sin^2(\theta_3 - \theta_4)}(h_{32} - h_{42})\right] \tag{10}$$

and

-continued $$h_{42}' = \frac{dh_{42}}{d\theta_2} = \frac{r_2}{r_4}\left[\frac{\cos(\theta_3 - \theta_2)}{\sin(\theta_4 - \theta_3)}(h_{32} - 1) - \frac{\sin(\theta_3 - \theta_2)\cos(\theta_3 - \theta_4)}{\sin^2(\theta_4 - \theta_3)}(h_{32} - h_{42})\right] \tag{11}$$

When the value of $M_2$ is zero, the equilibrium position will be stable if the second derivative of potential energy is positive. If the second derivative of potential energy is negative, the equilibrium position is unstable, and if it is zero, the equilibrium position is neutrally stable.

As the mechanism 10' moves from one stable position to another, the absolute value of $M_2$ will increase to some maximum before decreasing down to zero at the unstable position. This maximum moment represents the largest moment that must be applied to the input link to make the mechanism snap into its second position. This important value may be called the "critical moment," or, if a force is applied instead, the "critical force."

In addition, a high value of the second derivative at a stable position means that the energy curve is changing very rapidly at that point. This means that the restoring force returning the mechanism to that position is relatively high. Thus, the value of the second derivative at a stable position may be called the stable position's "stiffness," where a high stiffness corresponds to a rapidly increasing restoring force.

The mechanism shown in FIG. 3*c* may be further classified according to Grashof's criterion as a Grashof or non-Grashof mechanism. In a Grashof mechanism, the shortest link can rotate through a full revolution with respect to either link connected to it. In a non-Grashof mechanism, no link can rotate through a full revolution with respect to any other links. Recall that Grashof's criterion is mathematically stated as s+l≦p+q, where s is the length of the shortest link, 1 is the length of the longest link, and p and q are the lengths of the intermediate links. If the mechanism's link lengths satisfy this inequality, it is a Grashof mechanism. Crank rockers, double cranks, and double rockers are examples of Grashof mechanisms. If the inequality is not satisfied, the mechanism is non-Grashof. These mechanisms are triple rockers. If the sum of the lengths of the longest and shortest links is equal to the sum of the lengths of the other two links, the mechanism is a special case of a Grashof mechanism known as a change-point mechanism. Mathematically s+l>p+q non-Grashof s+l=p+q change point The requirements for bistable behavior will be different for Grashof and non-Grashof mechanisms. A Grashof four-bar link mechanism will be bistable if the torsional spring in the pseudo-rigid-body model is placed at either position opposite the shortest link. A change-point of non-Grashof mechanism will be bistable if a spring is placed at any one of the four joint positions. When more than one torsional spring is present in the pseudo-rigid-body model then an analysis of the potential energy is required to determine its stability.

Referring again to FIG. 1, the plurality of segments 14 advantageously may be integrally formed. In addition, the plurality of segments 14 (including rigid segments 22, 26 and 30, and the relatively flexible and resilient segment 34) and the flexible joints 52 (including the first, second and third flexible joints 58, 60 and 62) may be integrally formed. Thus, the plurality of segments 14 and flexible joints 52 may be formed from a single piece of material 80 having cross sectional dimensions including relatively wide portions 82, relatively thin portions 84, and portions with an intermediate width 86. The relatively rigid segments 18, 22, 26 and 30 are formed by the relatively wide portions 82. The substantially flexible joints 58, 60 and 62 are formed by the relatively thin portions 84. The relatively flexible and resilient segment 34 is formed by the portion of intermediate width 86, and is thus both flexible and resilient.

Figure 2A:
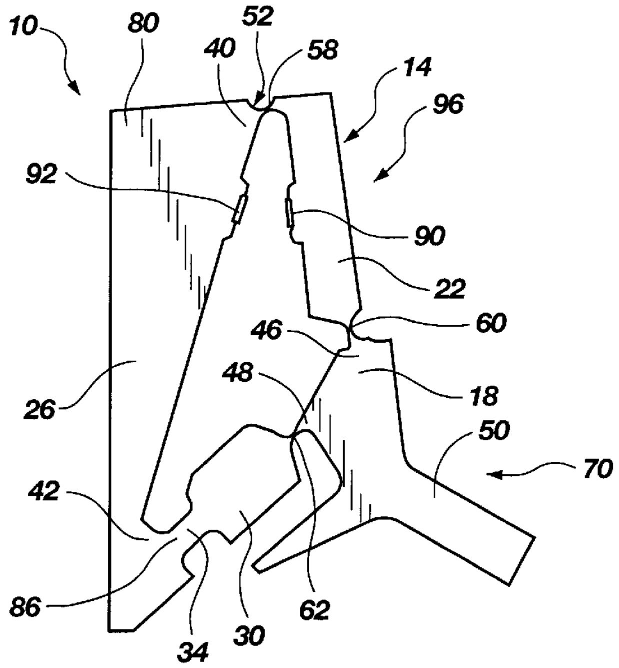
FIG. 2*a* is a side view of the preferred embodiment of the bistable switch mechanism of the present invention shown in a first off position.
Figure 2B:
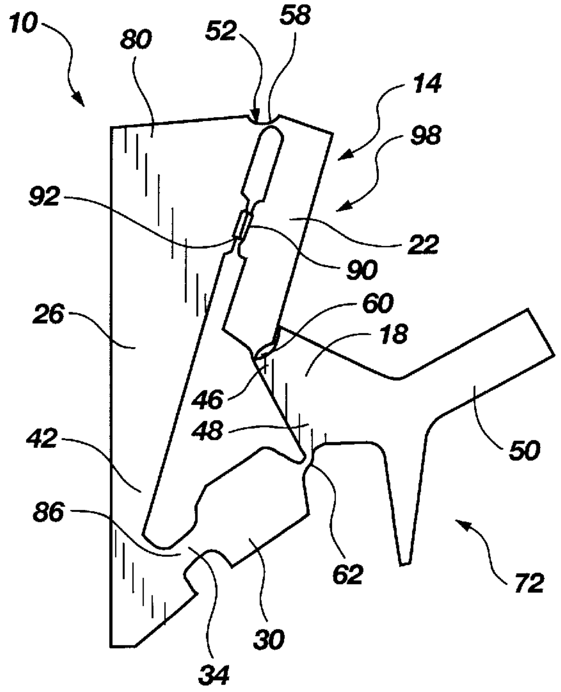
FIG. 2*b* is a side view of the preferred embodiment of the bistable switch mechanism of the present invention shown in a second on position.

The flexible joints 52 and pin joints 54 (FIG. 3*a*) allow the plurality of segments 14 to move relative to one another. Adjacent segments 14 pivot with respect to one another about the joint 52 (FIG. 2*a*) or 54 (FIG. 3*a*) coupling them. As indicated above, the relatively flexible and resilient segment 34 operates to resist relative movement of the segments 14, but allows the segments 14 to be selectively moved. The plurality of segments 14 cooperatively move with respect to one another between a first position 70, as shown in FIGS. 1 and 2*a,* and a second position 72, as shown in FIG. 2*b*. In addition, the relatively flexible and resilient segment 34 biases the plurality of segments 14 between the two positions 70 and 72.

Referring to FIGS. 1 and 2*a,* the first position 70 preferably is a stable, static, equilibrium position, or the plurality of segments are in a position in which they are stable, static, and in equilibrium. The first position 70 may be a low-energy position in which the relatively flexible and resilient segment 34 is substantially undeflected and stores substantially no energy. Alternatively, the first position 70 may be a force loaded position in which the relatively flexible and resilient segment 34 is deflected and stores energy.

Referring to FIG. 2b, the second position 72 may be a stable, static, equilibrium position, or the plurality of segments are in a position in which they are stable, static, and in equilibrium. The second position 72 also may be a low-energy position in which the relatively flexible and resilient segment 34 is substantially undeflected and stores substantially no energy. Alternatively, the second position 72 may be a force loaded position in which the relatively flexible and resilient segment 34 is deflected and stores energy. Thus, the mechanism 10 or segments 14 exert a force in the second position 72. The first arm segment 22 pivots towards the base segment 26 in the second position 72, or as the segments 14 move between first and second position 70 and 72. In addition, the second arm segment 30 pivots away from the base segment 26.

When a system has no acceleration, it may be said to be in a state of equilibrium. The state of equilibrium is stable if a small external disturbance causes oscillations about the equilibrium state. However, if a small external disturbance causes the system to diverge from its equilibrium state, then the equilibrium position is unstable. If, on the other hand, the system reacts to the disturbances and stays in the disturbed position, then the equilibrium position is neutral.

The stability of a system may be explained using the "ball on the hill" analogy which utilizes a position of a ball with respect to a hill flanked on both sides by valleys. A ball positioned in the valley is in a stable equilibrium position. If it is shifted from this position by a small amount, it will tend to return to the bottom of the valley or oscillate around it. However, a ball positioned on the top of the hill is in an unstable equilibrium position. Although the ball will stay in position if placed precisely on top of the hill, it will move to a different position if any disturbance occurs. Likewise, a ball positioned on the other side of the hill in the other valley is in a stable equilibrium position.

Because this system has two stable equilibrium positions, it is bistable. Because two local minima enclose a local maximum, two stable equilibrium positions will have an unstable position between them. Therefore, a bistable mechanism will have two stable equilibrium positions and at least one unstable equilibrium position.

Note that a ball positioned on the side of the hill is not in an equilibrium position. However, placing a stop on the side of the hill creates a new equilibrium position by the application of an external load. The stop could also be represented by a force of the proper magnitude and direction. This new equilibrium position is also stable.

Several methods have been developed to determine the stability of a system. The energy method, based on the Lagrange-Dirichlet theorem, states that a stable equilibrium position occurs at a position where the potential energy has a local minimum. Therefore, to establish the stability of a mechanism, the potential energy of the mechanism may be plotted over the mechanism's motion and any local minima represent stable positions. The potential energy curve is similar to the hill topography in the ball on the hill analogy.

Compliant bistable mechanisms gain their bistable behavior from the energy stored in the flexible segments which deflect to allow mechanism motion. This approach integrates desired mechanism motion and energy storage to create bistable mechanisms with dramatically reduced part count compared to traditional mechanisms incorporating rigid links, joints, and springs.

A bistable mechanism has two stable equilibrium positions within its range of motion. It achieves this behavior by storing energy during part of its motion, and then releasing it as the mechanism moves toward a second stable state. Compliant mechanisms, which gain motion through the deflection of their members, offer an economical way to accomplish bistable behavior. Because flexible segments store energy as they deflect, a compliant mechanism can use the same segments to gain both motion and two stable states, allowing a significant reduction in part count.

Bistable mechanisms offer two distinct, repeatable stable positions, allowing devices which utilize bistable mechanisms to require no power input to keep them in each position. Specific energy storage characteristics are necessary in these mechanisms to obtain the bistable behavior.

Referring to FIGS. 1, 2*a* and 2*b,* the switch mechanism 10 further includes two electrical contacts, a first electrical contact 90 and a second electrical contact 92 coupled to the segments 14. Preferably, the first electrical contact 90 is disposed on the first arm segment 22 while the second electrical contact 92 is disposed on the base segment 26. The first electrical contact 90 moves with the first arm segment 22 as the segments 14 move between the first and second positions 70 and 72. Thus, the first electrical contact 90 moves between a first location 96, as shown in FIGS. 1 and 2*a,* and a second location 98, as shown in FIGS. 2*b*. In the first location 96, the first electrical contact 90 is in a non-contacting relationship with the second electrical contact 92 and defines an "off" position. In the second location 98, the first electrical contact 90 contacts the second electrical contact 92 and defines an "on" position. It is of course understood that the contacts 90 and 92 may be disposed on any appropriate segments 14.

Figure 4C:
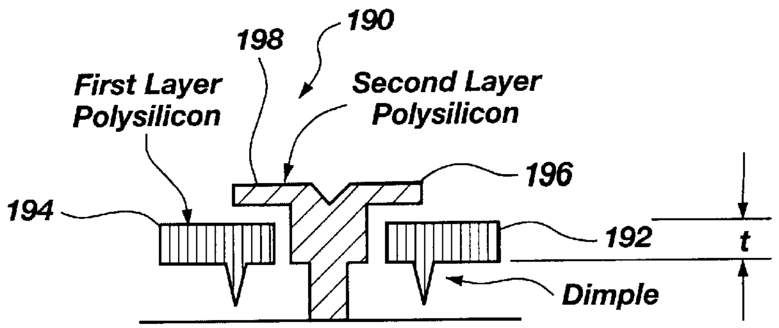
FIG. 4*c* is a cross-sectional side view of a pin joint of an alternative embodiment of a MEMS (micro-electric-mechanical system) of the present invention.
Figure 4A:
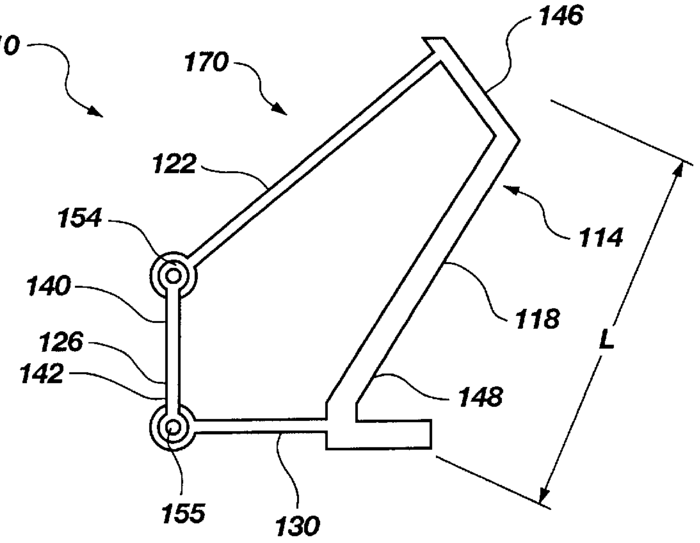
FIG. 4*a* is a side view of an alternative embodiment of a bistable mechanism of the present invention shown in a first position.
Figure 4B:
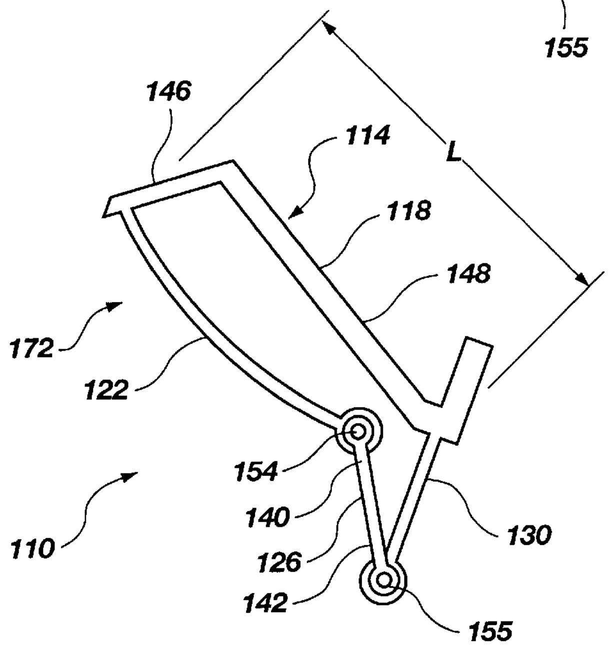
FIG. 4*b* is a side view of an alternative embodiment of a bistable mechanism of the present invention shown in a second position.

Referring to FIGS. 4*a* and 4*b,* an alternative embodiment of a bistable mechanism, indicated generally at 110, is shown. Similar to the above described mechanism 10, the alternative mechanism 110 has a plurality of segments, indicated generally at 114, coupled end-to-end in series to form a continuous chain of segments.

The plurality of segments 114 includes a first relatively rigid base segment 126, a second relatively rigid coupling segment 118, and first and second arm segments 122 and 130. The base segment 126 has first and second ends 140 and 142. Similarly, the coupling segment 118 has first and second ends 146 and 148. The first arm segment 122 is coupled between the first ends 140 and 146 of the base segment 126 and the coupling segment 118. Similarly, the second arm segment 130 is coupled between the second ends 142 and 148 of the base segment 126 and the coupling segment 118.

The first and second arm segments 122 and 130 are relatively flexible and resilient. The rigid coupling segment 118 is fixedly coupled to the adjacent flexible and resilient arm segments 122 and 130. The rigid base segment 126 is coupled to the adjacent flexible and resilient arm segments by either flexible joints (not shown), or pin joints 154 and 155. The pin joints 154 and 155 may be typical pin joints, as are well known in the art. The base segment 126 is coupled to the first arm segment 122 by a first pin joint 154; the coupling segment 118 is fixedly coupled to the first arm segment; the coupling segment 118 is fixedly coupled to the second arm segment 130; and the base segment 126 is coupled to the second arm segment 130 by a second pin joint 155.

The sum of the pin joints 154 and 155, the flexible joints (none shown), and the relatively flexible and resilient segments 122 and 130 is at least four. In the alternative mechanism 110, there are two pin joints 154 and 155, and two relatively flexible and resilient segments 122 and 130, which sum to four.

As with the preferred embodiment of the mechanism 10, the plurality of segments 114 in the alternative embodiment of the mechanism 110 may be integrally formed. The rigid coupling segment 118 and the first and second arm segments 122 and 130 are integrally formed. It is of course understood that the rigid base segment 126 may be integrally formed with the arm segments 122 and 130, and that the pin joints 154 and 155 may be replaced with flexible joints.

The pin joints 154 and 155 allow the plurality of segments 114 to move relative to one another. At least one of the relatively flexible and resilient segments 122 and 130 operate to resist relative movement of the segments 114, but allows the segments 114 to be selectively moved. The plurality of segments 114 cooperatively move with respect to one another between a first position 170, as shown in FIG. 4*a*, and a second position 172, as shown in FIG. 4*b*. In addition, at least one of the relatively flexible and resilient segments 122 and 130 biases the plurality of segments 114 between the two positions 170 and 172.

Referring to FIG. 4*a*, the first position 170 preferably is a stable, static, equilibrium position, or the plurality of segments are in a position in which they are stable, static, and in equilibrium. The first position 170 is a low-energy position in which the relatively flexible and resilient segments 122 and 130 are substantially undeflected and store substantially no energy. Alternatively, the first position 170 may be a force loaded position in which the relatively flexible and resilient segments 122 and 130 are deflected and store energy.

Referring to FIG. 4*b*, the second position 172 is a force loaded position in which the first relatively flexible and resilient arm segment 122 is deflected and stores energy. Thus, the mechanism 110 or segments 114 may exert a force in the second position 172. Alternatively, the second position 172 may be a stable, static, equilibrium position, or the plurality of segments are in a position in which they are stable, static, and in equilibrium. The second position 172 also may be a low-energy position in which the relatively flexible and resilient segments 122 and 130 are substantially undeflected and store substantially no energy.

The mechanism 110 also may be a micro-mechanism, or formed as a MEMS (micro-electro-mechanism system), as shown. Each segment 114 may have a length L which is less than 500 microns and a thickness +(FIG. 4*c*) less than 3 microns. MEMS mechanisms may be fabricated using a Multi-User MEMS Process (MUMPS) at MCNC. This process uses two released layers of polysilicon. The first layer has a thickness of 2.0 $\mu$m. In addition, the "stacked polysilicon" method as described by Comtois, John H. and Bright, Victor M. "Applications for Surface-Micromachined Polysicon Thermal Actuators and Arrays, "*Sensors and Actuators,* January 1997, pp. 19–25, Vol. 58, No. 1." may be used to make small-length flexural pivots as thick as both layers, or 3.5 $\mu$m thick. FIG. 4*c* shows a cross-section of a pin joint, indicated generally at 190, fixed to a substrate. The pin joint may be formed as shown in FIG. 4*c* with a disk 192 formed from the first layer 194 of polysilicon, and a post 196 formed from the second layer 198.

Figure 5B:
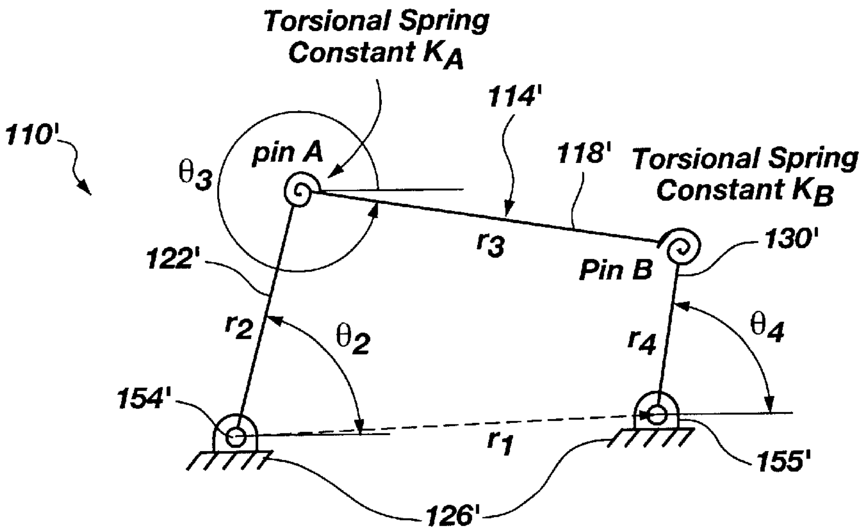
FIG. 5*b* is a pseudo-rigid-body model of the alternative embodiment of the bistable mechanism of the present invention.
Figure 5A:
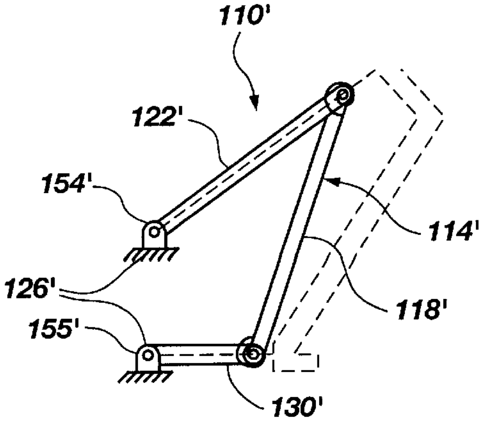
FIG. 5*a* is a schematic view of the alternative embodiment of the bistable mechanism of the present invention showing its corresponding pseudo-rigid-body model.

Referring to FIGS. 5*a* and 5*b*, a schematic and a pseudo-rigid-body model, indicated generally at 110', of the mechanism is shown. The pseudo-rigid-body model 110' resembles, or corresponds to, a four-bar linkage.

To design compliant bistable planar MEMS, a specific class of mechanisms was defined, known as Young mechanisms. A Young mechanism is one that: has two revolute joints 154' and 155', and therefore, two links, where a link is defined as the continuum between two rigid-body joints; has two compliant segments 122' and 130', both part of the same link; and has a pseudo-rigid-body model which resembles a four-bar mechanism.

The first and second conditions, taken together, imply that the two pin joints 154' and 155' are connected with one completely rigid link 126', while the other link consists of two compliant segments 122' and 130' and one or more rigid segments 118'. A general pseudo-rigid-body model of a Young mechanism 110' is shown in FIG. 5*b*. In this model, the two revolute joints 154' and 155' are connected to ground (or rigid base segment 126'), while Pin A and Pin B represent complaint segments modeled by the pseudo-rigid-body model.

Young mechanisms make sense for MEMS for several reasons. For example, pin joints connected to the substrate (ground) can easily be fabricated with two layers of polysilicon, but true pin joints connecting two moving links require more layers. Also, the two pin joints help the mechanism to achieve larger motion, in general, by reducing the stress in the compliant segments. In addition, the two compliant segments give the mechanism the energy storage elements it needs for bistable behavior.

Three main classes of Young mechanisms may be defined, depending on the type of compliant segments used. These are:

Class I: Both compliant segments are fixed-pinned segments.

Class II: One compliant segment is a fixed-pinned segment, and the other is a small-length flexural pivot.

Class III: Both compliant segments are small-length flexural pivots.

A unique Young mechanism of Class I may be described using the seven parameters $r_1$, $r_2$, $r_4$, $\theta_{20}$, $\theta_{40}$, $I_2$, and $I_4$, where each parameter is defined as:

$r_1$—the distance between the centers of the pin joints.

$r_2$—the length of the largest side link of the pseudo-rigid-body model. The length $l_2$ of the associated compliant fixed-pinned segment may be found from the equation $$l_2 = \frac{r_2}{\gamma} \quad (12)$$

where γ is approximately 0.85, as approximated for any material properties, but may be tabulated for a wide range of loading conditions.

$r_4$—the length of the shortest side link of the pseudo-rigid-body model. The length $l_4$ of the associated compliant fixed-pinned segment may be found using the same method used to find $l_2$.

$\theta_{20}$—the initial value of $\theta_2$ (defined in FIG. 5*b*) at the undeflected position.

$\theta_{40}$—the initial value of $\theta_4$ (defined in FIG. 5*b*) at the undeflected position. An alternate approach to define the mechanism would be to specify the value of $r_3$ rather than one of the two initial angles. However, while $r_3$ describes the length of the third link in the pseudo-rigid-body model, it has little physical significance in the actual compliant mechanism. In addition, if only one angle is specified, the mechanism could take either the leading or the lagging form based on the link lengths, so that the definition of the mechanism would be less precise.

$I_2$—the area moment of inertia of the flexible segment associated with link 2. For a rectangular cross-section, $$I = \frac{ht^3}{12} \quad (13)$$

where h is the height of the beam (out of the plane of motion) and t is the segment's thickness (within the plane of motion).

$I_4$—the area moment of inertia of the flexible segment associated with link 4. It is given by Equation (13).

Given these values and the material's Young's modulus, the values of the torsional spring constants may be calculated from the equations $$K_A = \gamma K_\theta \frac{EI_2}{l_2} \quad (14)$$

$$K_B = \gamma K_\theta \frac{EI_4}{l_4} \quad (15)$$

where γ and $K_\theta$ are approximately 0.85 and 2.65, as approximated for any material properties, but may be tabulated for a wide range of loading conditions.

Similar parameters are required to define mechanisms of Class II, but an additional variable is needed to define the length of the small-length flexural pivot. The parameters defining a Class II mechanism are:

$r_1$, $r_4$, $\theta_{20}$, $\theta_{40}$, and $I_4$—same as for class I.

$r_2$—the length of pseudo-link 2, defined as the distance from the pin joint to the center of the small-length flexural pivot. No associated value of $l_2$ may be defined.

$I_2$—the area moment of inertia of the small-length flexural pivot, given by Equation (13).

$l_s$—length of the small-length flexural pivot.

Spring constant $K_B$ is the same as for Class I, but $K_A$ must be found from the equation $$K_A = \frac{EI_2}{l_s} \quad (16)$$

To design bistable Young mechanisms, equations must be used which relate the motion and potential energy of the mechanism. The motion of the model shown in FIG. 5*b* may be found as a function of $\theta_2$ using rigid-body kinematics textbooks. The potential energy equation may be found by summing the energy stored in the two torsional springs:

$$V=\tfrac{1}{2}(K_A\psi_A^2+K_B\psi_B^2) \quad (17)$$

where V is the potential energy, $K_A$ and $K_B$ are the torsional spring constants, and $\psi_A$ and $\psi_B$ are the relative deflections of the torsional springs. These are given by $$\psi_A=(\theta_2-\theta_{20})-(\theta_3-\theta_{30})$$

$$\psi_B=(\theta_4-\theta_{40})-(\theta_3-\theta_{30}) \quad (18)$$

where the "0" subscript denotes the initial (undeflected) value of each angle. The minima of Equation (17) may be found by locating zeroes of the first derivative of V where the second derivative is positive. The first derivative of V with respect to $\theta_2$ is $$\frac{dV}{d\theta_2} = K_A\psi_A(1-h_{32}) + K_B\psi_B(h_{42}-h_{32}) \quad (19)$$

where $h_{32}$ and $h_{42}$ are the kinematic coefficients $$h_{32} = \frac{d\theta_3}{d\theta_2} = \frac{r_2\sin(\theta_4-\theta_2)}{r_3\sin(\theta_3-\theta_4)} \quad (20)$$

$$h_{42} = \frac{d\theta_4}{d\theta_2} = \frac{r_2\sin(\theta_3-\theta_2)}{r_4\sin(\theta_4-\theta_3)} \quad (21)$$

The second derivative of potential energy is $$\frac{d^2V}{d\theta_2^2} = K_A(1-2h_{32}+h_{32}^2-\psi_A h'_{32}) + K_B[h_{42}^2-2h_{42}h_{32}+h_{32}^2+\psi_B(h'_{42}-h'_{32})] \quad (22)$$

where $$h'_{32} = \frac{dh_{32}}{d\theta_2} = \frac{r_2}{r_3}\left[\frac{\cos(\theta_4-\theta_2)}{\sin(\theta_3-\theta_4)}(h_{42}-1) - \frac{\sin(\theta_4-\theta_2)\cos(\theta_3-\theta_4)}{\sin^2(\theta_3-\theta_4)}(h_{32}-h_{42})\right] \quad (23)$$

$$h'_{42} = \frac{dh_{42}}{d\theta_2} = \frac{r_2}{r_4}\left[\frac{\cos(\theta_3-\theta_2)}{\sin(\theta_3-\theta_4)}(h_{32}-1) - \frac{\sin(\theta_3-\theta_2)\cos(\theta_3-\theta_4)}{\sin^2(\theta_3-\theta_4)}(h_{32}-h_{42})\right] \quad (24)$$

Any value of $\theta_2$ for which Equation (19) is zero and Equation (22) is positive identifies a relative minimum of potential energy, and, thus, a stable equilibrium position.

The maximum nominal stress in the compliant segment during motion is another important quantity to consider. Compliant mechanism theory can be used to find this stress from the maximum angular deflection of each segment, $\psi_{A,max}$ and $\psi_{B,max}$. For either compliant segment, the maximum nominal stress may be approximated with the classical stress equation $$\sigma_{0\max} = \frac{M_{\max}c}{I} \quad (25)$$

where $M_{max}$ may be approximated, using the pseudo-rigid-body model as the product of K and $\psi_{max}$. Assuming a rectangular cross section, $$\sigma_{0max} = \frac{6K\psi_{max}}{ht^2} \quad (26)$$

where h is the height of the compliant beam (the dimension out of the plane of motion) and t is its thickness (the dimension within the plane of motion). This nominal stress is the stress calculated without taking stress at fracture of previously-tested devices with similar stress concentrations.

To design the mechanisms presented here, the seven (Class I) or eight (Class II) parameters described above were varied to find mechanism configurations with two stable positions, as determined by the potential energy equation, without exceeding the polysilicon strength during motion. To avoid fracture, a maximum strain, equal to the ratio of ultimate strength to Young's modulus, $S_{UT}/E$, was specified to be $1.05\times10^{-2}$. This value was determined from prior experience in the design of compliant micro-mechanisms.

Figure 6A:
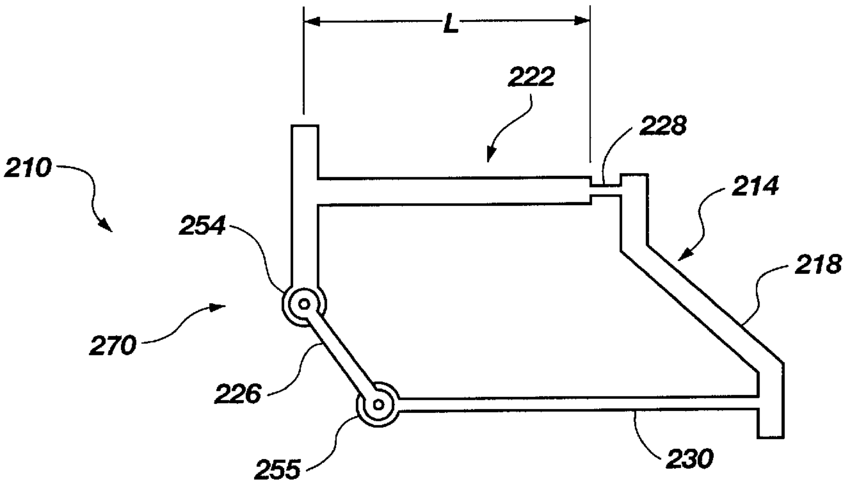
FIG. 6*a* is a side view of an alternative embodiment of a bistable mechanism of the present invention shown in a first position.
Figure 6B:
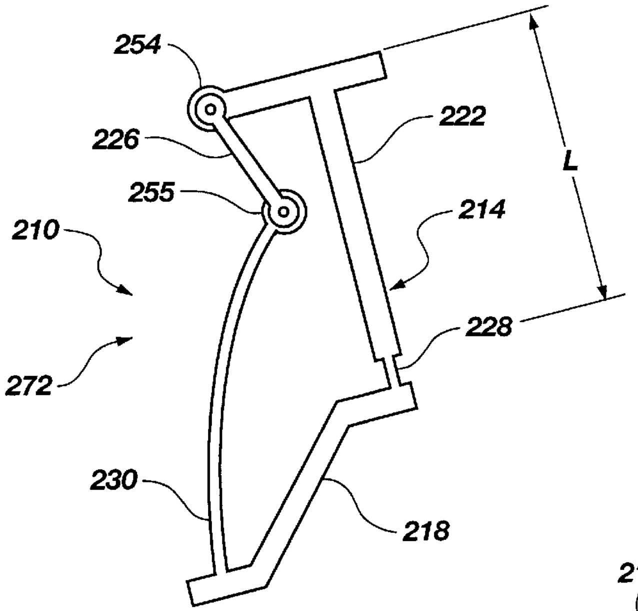
FIG. 6*b* is a side view of an alternative embodiment of a bistable mechanism of the present invention shown in a second position.

Referring to FIGS. 6*a* and 6*b*, an alternative embodiment of a bistable mechanism, indicated generally at 210, is shown which is characterized as a class II Young's mechanism. Similar to the above described mechanisms 10 and 110, the alternative mechanism 210 has a plurality of segments, indicated generally at 214, coupled end-to-end in series to form a continuous chain of segments.

The plurality of segments 214 includes a first relatively rigid base segment 226, and second and third relatively rigid segments 218 and 222. The plurality of segments 214 includes first and second relatively flexible and resilient segments 228 and 230.

The first rigid segment 222 is pivotally coupled to the base segment 226 by a pin joint 254. The first flexible and resilient segment 228 is fixedly coupled to and between the first and second rigid segments 222 and 214. The second flexible and resilient segment 230 is pivotally coupled to the rigid base segment 226 by a pin joint 255, and fixedly coupled to the second rigid segment 218. The first flexible and resilient segment 230 is coupled between the rigid base segment 226 and the second rigid segment 218.

The sum of the pin joints 254 and 255, the flexible joints (none shown), and the relatively flexible and resilient segments 228 and 230 is at least four. In the alternative mechanism 210, there are two pin joints 254 and 255, and two relatively flexible and resilient segments 228 and 230, which sum to four.

As with the preferred embodiment of the mechanism 10, the plurality of segments 214 in the alternative embodiment of the mechanism may be integrally formed. The rigid first and second segments 222 and 218, and the first and second flexible and resilient segments 228 and 230, are integrally formed. It is of course understood that the rigid base segment 226 may be integrally formed with the first rigid segment 222 and the second flexible and resilient segment 230, and that the pin joints 254 and 255 may be replaced with flexible joints.

The plurality of segments 214 cooperatively move with respect to one another between a first position 270, as shown in FIG. 6*a*, and a second position 272, as shown in FIG. 6*b*. In addition, at least one of the relatively flexible and resilient segments 228 and 230 biases the plurality of segments 214 between the two positions 270 and 272.

Referring to FIG. 6*a*, the first position 270 preferably is a stable, static, equilibrium position, or the plurality of segments are in a position in which they are stable, static, and in equilibrium. The first position 270 is a low-energy position in which the relatively flexible and resilient segments 228 and 230 are substantially undeflected and store substantially no energy.

Referring to FIG. 6*b*, the second position 272 is a force loaded position in which the second relatively flexible and resilient arm segment 230 is deflected and stores energy. Thus, the mechanism 210 or segments 214 may exert a force in the second position 272.

As with the alternative embodiment of the mechanism 110 described above, this alternative embodiment of the mechanism 210 may be a micro-mechanism, or formed as a MEMS (micro-electro-mechanism system). Each segment 214 may have a length L which is less than 500 microns and a thickness +(FIG. 4*c*) less than 3 microns.

Figure 7:
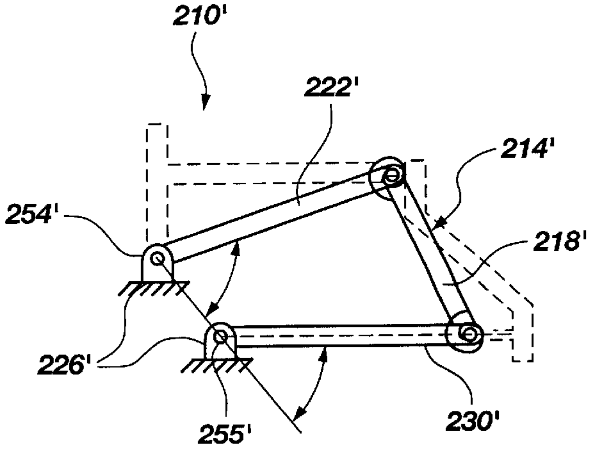
FIG. 7 is a schematic view of the alternative embodiment of the bistable mechanism of the present invention showing its corresponding pseudo-rigid-body model.

Referring to FIG. 7, a pseudo-rigid-body model, indicated generally at 210', of the mechanism is shown. The pseudo-rigid-body model 210' resembles, or corresponds to, a four-bar linkage.

Figure 8:
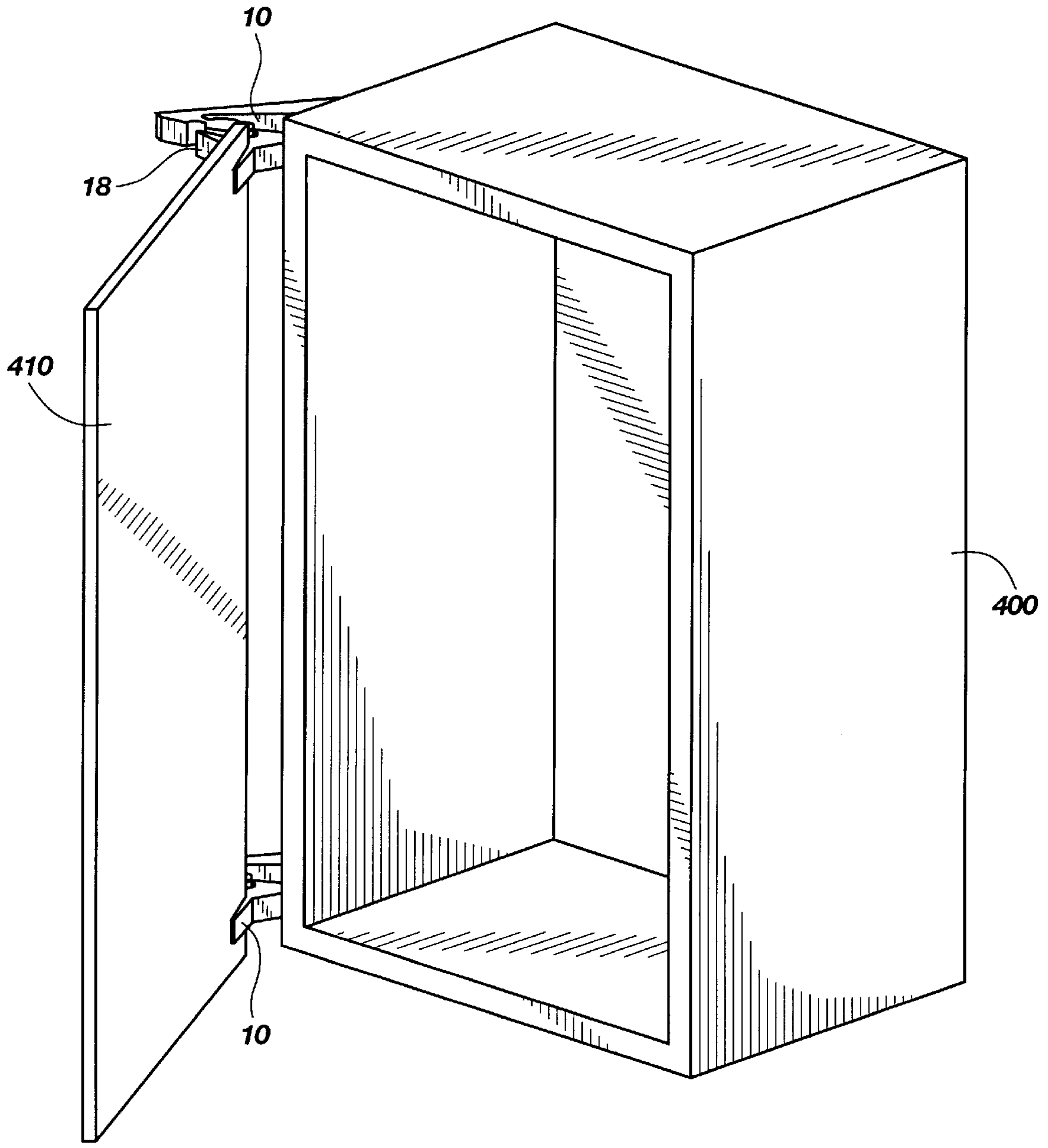
FIG. 8 is a perspective view of an alternative embodiment of a bistable mechanism of the present invention.

Referring to FIG. 8, the preferred embodiment of the bistable mechanism 10 is shown in an application as a hinge, as opposed to an electrical switch. Thus, one segment, such as the base segment 26 is coupled to a cabinet or box 400, while another segment, such as segment 18, is coupled to a door or lid 410.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. An asymmetric bistable mechanism comprising:

a) a plurality of segments coupled end-to-end in series to form a continuous chain of segments in an asymmetric configuration, the plurality of segments including:
   1) at least two rigid segments, and
   2) at least one flexible and resilient segment; and b) the at least one flexible and resilient segment being operable to resist relative movement of the segments, but to allow the segments to be selectively moved, the plurality of segments being cooperatively movable relative to one another, and biased by the at least one flexible and resilient segment, between 1) a first, stable, static, equilibrium position, and 2) a second, stable, static, equilibrium position.

2. The bistable mechanism of claim 1, wherein the plurality of segments are integrally formed.

3. The bistable mechanism of claim 1, wherein the plurality of segments includes four relatively rigid segments and one relatively flexible and resilient segment, the relatively flexible and resilient segment being fixedly coupled to adjacent rigid segments.

4. The bistable mechanism of claim 1, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

5. The bistable mechanism of claim 1, further comprising:

two electrical contacts coupled to the plurality of segments including first and second electrical contacts, the first electrical contact being movable with one of the segments between (i) a first location in which the first electrical contact contacts the second electrical contact defining an on position, and (ii) a second location in which the first electrical contact is in a non-contacting relationship with the second electrical contact defining an off position.

6. The bistable mechanism of claim 1, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

7. The bistable mechanism of claim 6, wherein the segments are coupled at coupling points by three substantially flexible joints and one relatively flexible and resilient segment.

8. The bistable mechanism of claim 6, wherein at least one of the arm segments is a relatively flexible and resilient segment.

9. The bistable mechanism of claim 1, wherein the plurality of segments has a pseudo-rigid-body model resembling a four-bar linkage.

10. The bistable mechanism of claim 1, wherein each segment has a length less than 500 microns.

11. The bistable mechanism of claim 1, wherein each segment has a thickness less than 3 microns.

12. The bistable mechanism of claim 1, wherein all of the segments have different lengths.

13. The bistable mechanism of claim 1, wherein all of the segments have lengths which remain constant.

14. The bistable mechanism of claim 1, wherein the at least one flexible and resilient segment bends, without significant compression.

15. The bistable mechanism of claim 1, wherein each of the segments has opposing ends, and wherein a distance between the ends remains constant.

16. The bistable mechanism of claim 1, wherein the plurality of segments includes two flexible and resilient segments.

17. The bistable mechanism of claim 1, wherein the plurality of segments includes four segments; and wherein a sum of lengths of a shortest segment and a longest segment is less than a sum of length of the other two segments.

18. The bistable mechanism of claim 1, wherein the plurality of segments includes four segments; and wherein a sum of lengths of a shortest segment and a longest segment is greater than a sum of length of the other two segments.

19. A bistable mechanism comprising:

a) a plurality of segments coupled end-to-end in series to form a continuous chain of segments, the plurality of segments including:

1) at least two rigid segments, and 2) at least one flexible and resilient segment; and b) the at least one flexible and resilient segment bending without significant compression to resist relative movement of the segments, but to allow the segments to be selectively moved, the plurality of segments being cooperatively movable relative to one another, and biased by the at least one flexible and resilient segment, between 1) a first, stable, static, equilibrium position, and 2) a second, stable, static, equilibrium position.

20. The bistable mechanism of claim 19, wherein the plurality of segments are integrally formed.

21. The bistable mechanism of claim 19, wherein the plurality of segments includes four relatively rigid segments and one relatively flexible and resilient segment, the relatively flexible and resilient segment being fixedly coupled to adjacent rigid segments.

22. The bistable mechanism of claim 19, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

23. The bistable mechanism of claim 19, further comprising:

two electrical contacts coupled to the plurality of segments including first and second electrical contacts, the first electrical contact being movable with one of the segments between (i) a first location in which the first electrical contact contacts the second electrical contact defining an on position, and (ii) a second location in which the first electrical contact is in a non-contacting relationship with the second electrical contact defining an off position.

24. The bistable mechanism of claim 19, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

25. The bistable mechanism of claim 24, wherein the segments are coupled at coupling points by three substantially flexible joints and one relatively flexible and resilient segment.

26. The bistable mechanism of claim 24, wherein at least one of the arm segments is a relatively flexible and resilient segment.

27. The bistable mechanism of claim 19, wherein each segment has a length less than 500 microns.

28. The bistable mechanism of claim 19, wherein each segment has a thickness less than 3 microns.

29. The bistable mechanism of claim 19, wherein all of the segments have different lengths.

30. The bistable mechanism of claim 19, wherein all of the segments have lengths which remain constant.

31. The bistable mechanism of claim 19, wherein the segments are sized and arranged in an asymmetric configuration.

32. The bistable mechanism of claim 19, wherein each of the segments has opposing ends, and wherein a distance between the ends remains constant.

33. The bistable mechanism of claim 19, wherein the plurality of segments includes two flexible and resilient segments.

34. The bistable mechanism of claim 19, wherein the plurality of segments includes four segments; and wherein a sum of lengths of a shortest segment and a longest segment is less than a sum of length of the other two segments.

35. The bistable mechanism of claim 19, wherein the plurality of segments includes four segments; and wherein a sum of lengths of a shortest segment and a longest segment is greater than a sum of length of the other two segments.

36. A bistable mechanism comprising:

a) a plurality of segments coupled end-to-end in series to form a continuous chain of segments, the plurality of segments each having a different length, and including:

1) at least two rigid segments, and 2) at least one flexible and resilient segment; and b) the at least one flexible and resilient segment being operable to resist relative movement of the segments, but to allow the segments to be selectively moved, the plurality of segments being cooperatively movable relative to one another, and biased by the at least one flexible and resilient segment, between 1) a first, stable, static, equilibrium position, and 2) a second, stable, static, equilibrium position.

37. The bistable mechanism of claim 36, wherein the plurality of segments are integrally formed.

38. The bistable mechanism of claim 36, wherein the plurality of segments includes four relatively rigid segments and one relatively flexible and resilient segment, the relatively flexible and resilient segment being fixedly coupled to adjacent rigid segments.

39. The bistable mechanism of claim 36, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

40. The bistable mechanism of claim 36, further comprising:

two electrical contacts coupled to the plurality of segments including first and second electrical contacts, the first electrical contact being movable with one of the segments between (i) a first location in which the first electrical contact contacts the second electrical contact defining an on position, and (ii) a second location in which the first electrical contact is in a non-contacting relationship with the second electrical contact defining an off position.

41. The bistable mechanism of claim 36, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

42. The bistable mechanism of claim 41, wherein the segments are coupled at coupling points by three substantially flexible joints and one relatively flexible and resilient segment.

43. The bistable mechanism of claim 41, wherein at least one of the arm segments is a relatively flexible and resilient segment.

44. The bistable mechanism of claim 36, wherein the plurality of segments has a pseudo-rigid-body model resembling a four-bar linkage.

45. The bistable mechanism of claim 36, wherein each segment has a length less than 500 microns.

46. The bistable mechanism of claim 36, wherein each segment has a thickness less than 3 microns.

47. The bistable mechanism of claim 36, wherein the segments are arranged in an asymmetric configuration.

48. The bistable mechanism of claim 36, wherein all of the segments have lengths which remain constant.

49. The bistable mechanism of claim 36, wherein the at least one flexible and resilient segment bends, without significant compression.

50. The bistable mechanism of claim 36, wherein each of the segments has opposing ends, and wherein a distance between the ends remains constant.

51. The bistable mechanism of claim 36, wherein the plurality of segments includes two flexible and resilient segments.

52. The bistable mechanism of claim 36, wherein the plurality of segments includes four segments; and wherein a sum of lengths of a shortest segment and a longest segment is less than a sum of length of the other two segments.

53. The bistable mechanism of claim 36, wherein the plurality of segments includes four segments; and wherein a sum of lengths of a shortest segment and a longest segment is greater than a sum of length of the other two segments.

54. An asymmetric bistable mechanism comprising:

a) a plurality of segments coupled end-to-end in series to form a continuous chain of segments, the plurality of segments including:

1) at least two rigid segments, and 2) at least one flexible and resilient segment;

b) the at least one flexible and resilient segment being operable to resist relative movement of the segments, but to allow the segments to be selectively moved, the plurality of segments being cooperatively movable relative to one another, and biased by the at least one flexible and resilient segment, between 1) a first, stable, static, equilibrium position, and 2) a second, stable, static, equilibrium position; and c) each of the segments having a length which remains constant.

55. The bistable mechanism of claim 54, wherein the plurality of segments includes four relatively rigid segments and one relatively flexible and resilient segment, the relatively flexible and resilient segment being fixedly coupled to adjacent rigid segments.

56. The bistable mechanism of claim 54, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

57. The bistable mechanism of claim 54, further comprising:

two electrical contacts coupled to the plurality of segments including first and second electrical contacts, the first electrical contact being movable with one of the segments between (i) a first location in which the first electrical contact contacts the second electrical contact defining an on position, and (ii) a second location in which the first electrical contact is in a non-contacting relationship with the second electrical contact defining an off position.

58. The bistable mechanism of claim 54, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

59. The bistable mechanism of claim 58, wherein the segments are coupled at coupling points by three substantially flexible joints and one relatively flexible and resilient segment.

60. The bistable mechanism of claim 58, wherein at least one of the arm segments is a relatively flexible and resilient segment.

61. The bistable mechanism of claim 54, wherein the plurality of segments has a pseudo-rigid-body model resembling a four-bar linkage.

62. The bistable mechanism of claim 54, wherein each segment has a length less than 500 microns.

63. The bistable mechanism of claim 54, wherein each segment has a thickness less than 3 microns.

64. The bistable mechanism of claim 54, wherein all of the segments have different lengths.

65. The bistable mechanism of claim 54, wherein the segments are sized and arranged in an asymmetric configuration.

66. The bistable mechanism of claim 54, wherein the at least one flexible and resilient segment bends, without significant compression.

67. The bistable mechanism of claim 54, wherein each of the segments has opposing ends, and wherein a distance between the ends remains constant.

68. The bistable mechanism of claim 54, wherein the plurality of segments includes two flexible and resilient segments.

69. The bistable mechanism of claim 54, wherein the plurality of segments includes four segments; and wherein a sum of lengths of a shortest segment and a longest segment is less than a sum of length of the other two segments.

70. The bistable mechanism of claim 54, wherein the plurality of segments includes four segments; and wherein a sum of lengths of a shortest segment and a longest segment is greater than a sum of length of the other two segments.

71. An asymmetric bistable switch device, comprising:

a) a plurality of segments coupled end-to-end in series to form a continuous chain of segments in an asymmetric configuration, the plurality of segments including:

1) at least two rigid segments, and 2) at least one flexible and resilient segment;

b) the at least one flexible and resilient segment being operable to resist relative movement of the segments, but to allow the segments to be selectively moved, the plurality of segments being cooperatively movable relative to one another, and biased by the at least one flexible and resilient segment, between 1) a first, stable, static, equilibrium position, and 2) a second, stable, static, equilibrium position; and c) two electrical contacts, coupled to the plurality of segments, including a first electrical contact being movable with one of the segments between 1) a first location in which the first electrical contact contacts the second electrical contact defining an on position, and 2) a second location in which the first electrical contact is in a non-contacting relationship with the second electrical contact defining an off position.

72. The bistable switch device of claim 71, wherein all of the segments have different lengths.

73. The bistable switch device of claim 71, wherein the plurality of segments are integrally formed.

74. The bistable switch device of claim 71, wherein the plurality of segments includes four relatively rigid segments and one relatively flexible and resilient segment, the relatively flexible and resilient segment being fixedly coupled to adjacent rigid segments.

75. The bistable switch device of claim 71, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

76. The bistable switch device of claim 71, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

77. The bistable switch device of claim 76, wherein the segments are coupled at coupling points by three substantially flexible joints and one relatively flexible and resilient segment.

78. The bistable switch device of claim 76, wherein at least one of the arm segments is a relatively flexible and resilient segment.

79. The bistable switch device of claim 71, wherein the plurality of segments has a pseudo-rigid-body model resembling a four-bar linkage.

80. The bistable switch device of claim 71, wherein each segment has a length less than 500 microns.

81. The bistable switch device of claim 71, wherein each segment has a thickness less than 3 microns.

82. The bistable switch device of claim 71, wherein all of the segments have lengths which remain constant.

83. The bistable switch device of claim 71, wherein the at least one flexible and resilient segment bends, without significant compression.

84. The bistable switch device of claim 71, wherein each of the segments has opposing ends, and wherein a distance between the ends remains constant.

85. The bistable switch device of claim 71, wherein the plurality of segments includes two flexible and resilient segments.

86. The bistable switch device of claim 71, wherein the plurality of segments includes four segments; and wherein a sum of lengths of a shortest segment and a longest segment is less than a sum of length of the other two segments.

87. The bistable switch device of claim 71, wherein the plurality of segments includes four segments; and wherein a sum of lengths of a shortest segment and a longest segment is greater than a sum of length of the other two segments.

88. An asymmetric bistable mechanism, comprising:

a) a plurality of segments coupled end-to-end in series to form a continuous chain of segments in an asymmetric configuration, the plurality of segments including:
   1) at least two rigid segments, and
   2) at least two flexible and resilient segments; and b) the at least two flexible and resilient segments being operable to resist relative movement of the segments, but to allow the segments to be selectively moved, the plurality of segments being cooperatively movable relative to one another, and biased by the at least two flexible and resilient segments, between 1) a first, stable, static, equilibrium position, and 2) a second, stable, static, equilibrium position.

89. The bistable mechanism of claim 88, wherein all of the segments have different lengths.

90. The bistable mechanism of claim 88, wherein the plurality of segments are integrally formed.

91. The bistable mechanism of claim 88, wherein the plurality of segments includes four relatively rigid segments and one relatively flexible and resilient segment, the relatively flexible and resilient segment being fixedly coupled to adjacent rigid segments.

92. The bistable mechanism of claim 88, wherein the first position is a low-energy position in which the at least one flexible and resilient member is substantially undeflected and stores substantially no energy; and wherein the second position is a force loaded position in which the at least one flexible and resilient segment is deflected and stores energy such that the mechanism exerts a force in the second position.

93. The bistable mechanism of claim 88, further comprising:

two electrical contacts coupled to the plurality of segments including first and second electrical contacts, the first electrical contact being movable with one of the segments between (i) a first location in which the first electrical contact contacts the second electrical contact defining an on position, and (ii) a second location in which the first electrical contact is in a non-contacting relationship with the second electrical contact defining an off position.

94. The bistable mechanism of claim 88, wherein the plurality of segments comprises:

a first relatively rigid base segment having first and second ends;

a second relatively rigid coupling segment movable with respect to the base segment and having first and second ends;

a first arm segment coupled between the base and coupling segments at the first ends thereof; and a second arm segment coupled between the base and coupling segments at the second ends thereof; and wherein the first arm segment pivots towards the base segment and the second arm segment pivots away from the base segment in the first orientation.

95. The bistable mechanism of claim 94, wherein the segments are coupled at coupling points by three substantially flexible joints and one relatively flexible and resilient segment.

96. The bistable mechanism of claim 94, wherein at least one of the arm segments is a relatively flexible and resilient segment.

97. The bistable mechanism of claim 88, wherein the plurality of segments has a pseudo-rigid-body model resembling a four-bar linkage.

98. The bistable mechanism of claim 88, wherein each segment has a length less than 500 microns.

99. The bistable mechanism of claim 88, wherein each segment has a thickness less than 3 microns.

100. The bistable mechanism of claim 88, wherein all of the segments have lengths which remain constant.

101. The bistable mechanism of claim 88, wherein the at least one flexible and resilient segment bends, without significant compression.

102. The bistable mechanism of claim 88, wherein each of the segments has opposing ends, and wherein a distance between the ends remains constant.

103. The bistable mechanism of claim 88, wherein the plurality of segments includes four segments; and wherein a sum of lengths of a shortest segment and a longest segment is less than a sum of length of the other two segments.

104. The bistable mechanism of claim 88, wherein the plurality of segments includes four segments; and wherein a sum of lengths of a shortest segment and a longest segment is greater than a sum of length of the other two segments.

* * * * *

UNITED STATES PATENT AND TRADEMARK OFFICE

CERTIFICATE OF CORRECTION

PATENT NO. : 6,215,081 B1
APPLICATION NO. : 09/280916
DATED : April 10, 2001
INVENTOR(S) : Brian Jensen et al.

It is certified that error appears in the above-identified patent and that said Letters Patent is hereby corrected as shown below:

Column 1; line 5 Add:

GOVERNMENT RIGHTS

This invention was made with government support under Grant No. DMI 9624574 awarded by National Science Foundation. The government has certain rights in the invention.

Signed and Sealed this

Seventeenth Day of February, 2009

JOHN DOLL
*Acting Director of the United States Patent and Trademark Office*